May 22, 1956  E. V. WYATT, JR  2,746,793
LAWN SPRINKLER
Filed Nov. 23, 1954
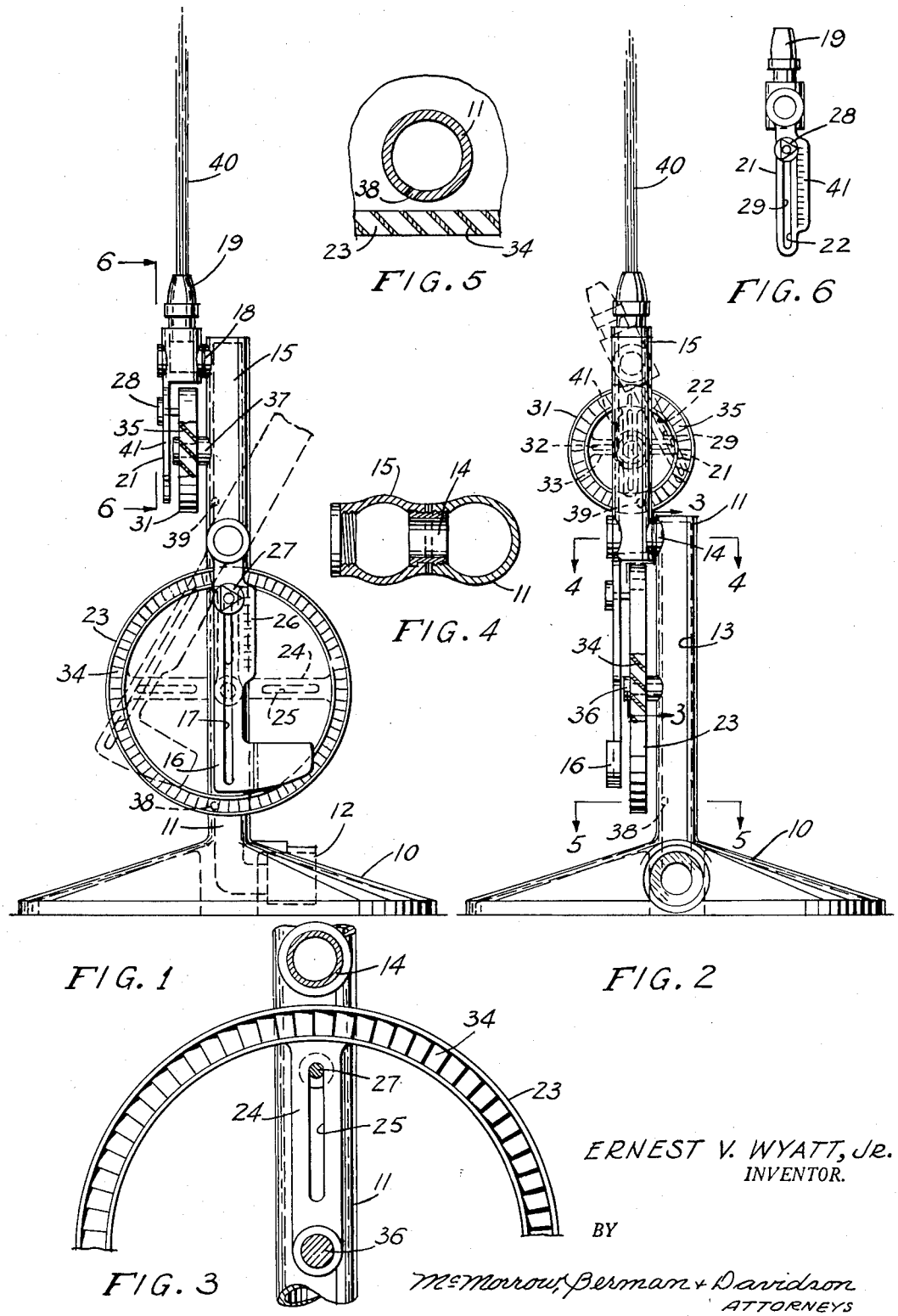
ERNEST V. WYATT, JR.
INVENTOR.
BY McMorrow, Berman + Davidson
ATTORNEYS United States Patent Office 2,746,793
Patented May 22, 1956

2,746,793
LAWN SPRINKLER
Ernest V. Wyatt, Jr., Hartford, Conn.
Application November 23, 1954, Serial No. 470,643
5 Claims. (Cl. 299—18)

The present invention relates to lawn sprinklers of the oscillating type for covering a large area of lawn.

The principal object of the present invention is to provide a lawn sprinkler for covering a four sided area of ground.

Another object of the present invention is to provide a lawn sprinkler which is automatic in action and one having a minimum of movable parts for applying water to a rectangular area of the lawn or garden.

A further object of the present invention is to provide an automatic lawn sprinkler for covering square or rectangular areas of lawns or gardens of various widths and lengths.

A still further object of the present invention is to provide a lawn sprinkler which is adjustable to cover either a large wide and long area or a relatively narrow and short area.

A still further object of the present invention is to provide a lawn sprinkler which is automatic in action and one which is constructed simply and may be assembled by a person without special skill and one which may be manufactured of lightweight materials without special tools.

These and other objects and advantages of the present invention will be readily apparent from the following description when taken in connection with the annexed drawings, in which:

Figure 1 is a front view in elevation of the present invention;

Figure 2 is a side view in elevation of the present invention;

Figure 3 is a detail view on line 3—3 of Figure 2;

Figure 4 is a detail vertical view on line 4—4 of Figure 2;

Figure 5 is a vertical vertical view in cross section on line 5—5 of Figure 2; and Figure 6 is a partial side view in elevation on line 6—6 of Figure 1;

Referring in greater detail to the drawing, in which like numerals indicate like parts throughout the several views, the invention is seen to consist of a portable base 10 carrying an upright standard 11. The base 10 has an inlet to which is attached a hose or other means of conducting water from a source of water under pressure. The standard is hollow and provides a passage 13 in communication with the inlet in the base.

The upper end of the standard 11 is provided with a side opening in which a swivel nipple 14 is secured, as seen most clearly in Figure 4. A hollow body 15 is connected to the nipple 14 and is pivotally movable with respect to the standard 11 in side to side movements, as seen in dotted lines in Figure 1.

The nipple 14 is at the lower end of the hollow body 15 and extending below that is a counterweight arm 16 having a slot 17 along its shank.

The upper end of the hollow body 15 is provided with a pivotal connection 18 supporting the nozzle 19 for back and forth movement relative to the standard 11. The lower end of the nozzle 19 is provided with an arm 21 having a slot 22.

A water wheel 23 is supported for rotation on the front of the standard 11 with its axis horizontal and is provided on its single diametrically arranged spoke 24 with a slot 25. The arm 16 is provided on one side with an outwardly projecting scale 26 and a knurled thumb screw 27 is slidably movable in both of the slots 17 on the arm 16 and the slot 25 on the spoke 24. The scale 26 is marked with indications indicating the length of the area sprayed. The arc of swing of the hollow body with respect to the standard 11 is made adjustable by moving the thumb screw 27 from one end to the other of the respective slots. A nut (not shown) is carried on the thumb screw behind the spoke 24 in order that the thumb screw 27 may be tightened in any adjusted position.

A similar thumb screw 28 is slidable in a slot 29 in the arm 21 which extends from the lower end of the nozzle 19.

A second water wheel 31 is provided and is mounted on a horizontal axis on one side of the body 15 with its axis arranged transversely and at a right angle to the axis of the water wheel 23. The water wheel 31 is provided with a slot 32 in its single diametrically arranged spoke 33. Thumb screw 28 is slidable in the slot 32 in the spoke 33. The arc of swing of the nozzle 19 with respect to the hollow body 15 is made adjustable by moving the thumb screw 28 from one end to the other in slot 32.

Each of the water wheels 23 and 31 are provided with obliquely arranged radial vanes 34 and 35 respectively on the periphery.

The axles 36 and 37 which support the water wheels 23 and 31 respectively are welded or cast on the side of the standard 11 and the hollow body 15, or if the sprinkler is constructed of plastic, they may be either formed with the standard and the hollow body or cemented thereto during the assembly.

A hole 38 is provided in the standard 11 at one end thereof and is obliquely arranged so as to form a jet orifice by means of which water from the passage 13 is diverted outwardly to impinge on the vanes 34. A similar hole 39 is provided on one side of the body 15 to form a jet orifice to permit water to impinge upon the vanes 35.

In operation, it will be seen that an adjustment of either or both of the thumb screws 27 and 28 will permit the arc of swing of the hollow body 15 from side to side and the nozzle 19 from backward and forward movements in order that various sized four-sided areas of a lawn or garden may be covered by the stream of water indicated by the reference numeral 40.

As seen in Figure 6, the arm 21 is provided on one side with an outwardly projecting scale 41 with indicium indicating the width of the area sprayed, the scale 41 being similar to the scale 26 on the arm 16, as seen most clearly in Figure 1.

While only a single embodiment has been here shown and described, other embodiments of the present invention may be made and practiced and many changes and modifications may be made within the scope of the appended claims without departing from the spirit of the invention.

What is claimed is:

1. A lawn sprinkler adapted for spraying a horizontal area generally in the form of a parallelogram comprising in combination, a supporting base having the lower end of an elongated standard fixed thereto and extending vertically therefrom, an elongated body and first pivotal connections between the lower end thereof and the upper end of the standard, a nozzle and second pivotal connection between the lower end thereof and the upper end of the body, said standard and body and nozzle and pivotal connections being hollow to provide an elongated continuous passageway from the lower end of the standard to and through the nozzle, the axis of said pivotal connections being horizontally disposed and right angularly related for relative oscillation of said body and nozzle in vertical planes at right angles to one another, lower body and upper nozzle water wheel members for oscillating said body and nozzle pivoted for rotation on said standard and body respectively, said standard and body being provided with jet orifices from said passageway for directing water jets to said water wheels, and separate adjustable connections between said body water wheel member and body and between said nozzle water wheel member and nozzle thereby through rotation of said water wheels to oscillate said body and nozzle through predetermined angles.

2. A lawn sprinkler adapted for spraying a horizontal area generally in the form of a parallelogram comprising in combination, a supporting base having the lower end of an elongated standard fixed thereto and extending vertically therefrom, an elongated body and first pivotal connections between the lower end thereof and the upper end of the standard, a nozzle and second pivotal connection between the lower end thereof and the upper end of the body, said standard and body and nozzle and pivotal connections being hollow to provide an elongated continuous passageway from the lower end of the standard to and through the nozzle, the axes of said pivotal connections being horizontally disposed and right angularly related for oscillation of said body and nozzle in planes at right angles to one another, lower body and upper nozzle water wheel members for oscillating said body and nozzle pivoted for rotation on said standard and body respectively, said standard and body being provided with jet orifices from said passageway for directing water jets to said water wheels, and separate adjustable connections between said body water wheel member and body and between said nozzle water wheel member and nozzle thereby through rotation of said water wheels to oscillate said body and nozzle through predetermined angles, said separate adjustable connections including elongated radial slots provided in said body and nozzle wheels having studs adjustable therealong and arms depending from said body and nozzle provided with elongated slots slidable receiving the studs of the body and nozzle wheels.

3. A lawn sprinkler adapted for spraying a horizontal area generally in the form of a parallelogram comprising in combination, a supporting base having the lower end of an elongated standard fixed thereto and extending vertically therefrom, an elongated body and first pivotal connections between the lower end thereof and the upper end of the standard, a nozzle and second pivotal connection between the lower end thereof and the upper end of the body, said pivotal connections being on horizontal parallel planes, said standard and body and nozzle and pivotal connections being hollow to provide an elongated continuous passageway from the lower end of the standard to and through the nozzle, the axis of said pivotal connections being horizontally disposed and right angularly related for oscillation of said body and nozzle in planes at right angles to one another, lower body and upper nozzle water wheel members for oscillating said body and nozzle pivoted for rotation on said standard and body respectively, said standard and body being provided with jet orifices from the passageway for directing water jets to said water wheels, and separate adjustable connections between said body water wheel member and body and between said nozzle water wheel member and nozzle whereby through rotation of said water wheels to oscillate said body and nozzle through predetermined angles, said separate adjustable connections including elongated radial slots provided in said body and nozzle wheels having studs adjustable therealong and arms depending from said body and nozzle provided with elongated slots slidable receiving the studs of the body and nozzle wheels, and said arms provided with indicia along the slots thereof.

4. A lawn sprinkler adapted for spraying a horizontal area generally in the form of a parallelogram comprising in combination, a support base, lower elongated standard and intermediate body and upper nozzle extending upwardly from said base in substantially end to end relation with their longitudinal axis disposed in vertical parallelism and being offset laterally relative to one another, adjacent ends of the said body and standard and adjacent ends of said nozzle and body having pivotal connections disposed on horizontal right angular axes for oscillation of the nozzle and body in right angular vertical planes, said standard and body and nozzle and pivotal connections being hollow for providing a continuous passageway for water, body and nozzle water wheels journalled for independent rotation on said standard and body respectively, said standard and body provided with jet outlets from the passageway thereof to direct water to said wheels, said wheels provided with radially extending elongated slots having studs adjustable in fixed positions therealong, and separate arms extending from said nozzle and body provided with elongated slots slidably receiving the studs of said nozzle and body wheels.

5. A lawn sprinkler adapted for spraying a horizontal area generally in the form of a parallelogram comprising in combination, a support base, lower elongated standard and intermediate body and upper nozzle extending upwardly from said base in substantially end to end relation with their longitudinal axes disposed in vertical parallelism and being offset laterally relative to one another, adjacent ends of the said body and standard and adjacent ends of said nozzle and body having pivotal connections disposed on horizontal right angular axes for oscillation of the nozzle and body in right angular vertical planes, said standard and body and nozzle and pivotal connections being hollow for providing a continuous passageway for water, body and nozzle water wheels journalled for independent rotation on said standard and body respectively, said standard and body provided with jet outlets from the passageway thereof to direct water to said wheels, said wheels provided with radially extending elongated slots having studs adjustable in fixed positions therealong, and separate arms extending from said nozzle and body provided with elongated slots slidably receiving the studs of said nozzle and body wheels, and said arms provided along the slots thereof with indicia.

References Cited in the file of this patent

UNITED STATES PATENTS

| | | |
|---|---|---|
| 902,662 | Johnson | Nov. 3, 1908 |
| 1,454,332 | Norton | May 8, 1923 |
| 2,084,585 | Keith | June 22, 1937 |
| 2,635,007 | Norman | Apr. 14, 1953 |

FOREIGN PATENTS

| | | |
|---|---|---|
| 719,048 | France | Feb. 1, 1932 |
| 738,092 | Germany | July 21, 1944 |